United States Patent [19]

Rushing et al.

[11] Patent Number: 4,715,557
[45] Date of Patent: Dec. 29, 1987

[54] WIRE CONTAINER

[75] Inventors: Frank C. Rushing, Columbia; Mark Weixel, Ellicott City, both of Md.

[73] Assignee: The United States of America as represented by the Secretary of the Air Force, Washington, D.C.

[21] Appl. No.: 13,819

[22] Filed: Feb. 11, 1987

[51] Int. Cl.$^4$ .................... B65H 49/00; B65H 75/14; B65H 75/28

[52] U.S. Cl. ................... 242/129; 242/118.4; 242/125.1; 242/117

[58] Field of Search ............... 242/129, 118.4, 118.41, 242/118.5, 118.6, 118.61, 118.62, 125.1, 125.2, 77, 77.3, 71.8, 117

[56] References Cited

U.S. PATENT DOCUMENTS

| 550,701 | 12/1895 | Wardwell, Jr. | 242/118.4 X |
| 2,124,512 | 7/1938 | Allen et al. | 242/118.4 X |
| 2,190,013 | 2/1940 | Byers | 242/118.4 |
| 2,472,248 | 6/1949 | Cox | 242/118.4 |
| 2,811,322 | 10/1957 | Wilkinson | 242/117 |
| 2,846,162 | 8/1958 | Allin, Sr. et al. | 242/117 |
| 2,987,267 | 6/1961 | Hayes et al. | 242/125.1 |
| 3,830,445 | 8/1974 | Moore | 242/118.4 |
| 3,840,198 | 10/1974 | Moore | 242/118.4 |
| 4,068,808 | 1/1978 | King | 242/118.4 |
| 4,089,486 | 5/1978 | Carter | 242/129 |
| 4,542,862 | 9/1985 | Romike et al. | 242/118.4 X |
| 4,638,558 | 1/1987 | Eaton | 242/129 X |

FOREIGN PATENT DOCUMENTS

| 1159313 | 2/1958 | France | 242/118.4 |
| 1245177 | 9/1960 | France | 242/118.4 |

*Primary Examiner*—Stanley N. Gilreath
*Attorney, Agent, or Firm*—Richard J. Donahue; Donald J. Singer

[57] ABSTRACT

A wire container for use with a robot-arm-manipulated wire routing tool in the fabrication of wire harnesses. The container is adapted to hold various cables, single wires and twisted pair wires of different lengths and wire sizes, and having different contact configurations on the ends thereof.

6 Claims, 13 Drawing Figures

WIRE CONTAINER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to wire containers and more specifically to a wire container for use in conjunction with a robot-arm-manipulated wire routing tool in the fabrication of wire harnesses.

A completed wire harness typically comprises a multiplicity of wires configured in a desired bundled layout, with the ends of each wire being terminated in a desired manner. For example, each such wire may have a contact affixed to each of its ends, where each contact is to be inserted into a contact holding device, such as a connector plug. In complex arrangements, numerous wires of varying lengths and types can be included in a single wire harness. Furthermore, such wires may require different contact configurations at their respective ends. In such situations, the task of producing such wire harnesses has been known to be a particularly laborious activity.

Fully automated fabrication is a sought-after goal in cost effective wire harnesses. Such wire harnesses are preferably assembled by means of manipulable tools, sometimes called end-effectors, which are attached to a robotic arm and can route wires in predetermined paths, or insert contacts of varying styles into connectors, or both.

An example of one such combined contact insertion and wire routing tool for manufacturing wire harnesses is disclosed in U.S. Pat. No. 4,549,347, issued to C. M. Travlos et al on Oct. 29, 1985. Another contact insertion type end-effector tool for use in the robotic assembly of wire harnesses is disclosed in U.S. Pat. No. 4,598,469, issued to M. S. Weixel on July 8, 1986.

The specific steps typically involved in the automated fabrication of wire harnesses are the steps of unloading a wire from a wire prep station, loading the wire into a wire container, transporting the wire container to a harness formation station, loading the wire container onto a wire routing end-effector, routing the wire within the wire container along a predetermined two-dimensional path, and terminating both wire ends.

To date, the approach usually taken to automate the robotic fabrication of a wire harness is the two-arm approach. It consists of using a robot having two arms, the first arm being responsible for loading a wire container thereon, placing a wire end into a holder at the harness formation station, routing a specified length of wire along a two-dimensional path, and placing the second wire end into a holder. If the buffered wire end is a contact that requires an insertion into a connector, then a second robot arm manipulating a contact insertion type end-effector will retrieve the contact and proceed to perform a contact insertion, while the first robot arm is loading the next wire container. This action continues on a wire-by-wire basis until all of the wires are routed and properly terminated. In this two-arm robot approach, the wire routing end-effector is not responsible for performing contact insertions.

One of the important elements of such an automated harness formation station is the wire container device. It must be constructed to simplify loading of a wire into the container at a wire prep station, be readily transportable from the wire prep station to a harness formation station without damaging the wire, and be tailored to the specific needs of the wire routing end-effector at the harness formation station.

Additional requirements affecting the wire container design include the capability, in certain applications, to route and terminate prepared single wires and cables of lengths ranging from 6 inches to perhaps 12 feet. Such wires may have American gauge conductor sizes ranging from 16 to 24, and insulation thicknesses of 0.003 to 0.010 inches. The cables to be held and dispensed by the container may consist of prepared coaxial wires, prepared twisted wire cables, (twisted pairs being the most common) and shielded cables. The prepared cables may have outside diameters of up to 0.25 inches. Both wires and cables may have tinned ends, ends prepared with MIL C-39029 crimp contacts or ends prepared with MS 25036 crimp lugs.

Various wire and cable containing and dispensing devices are presently known in the art. Examples of such devices are disclosed in U.S. Pat. Nos. 2,811,322; 2,846,162; 2,987,278; and 4,089,486. Unfortunately no prior art wire containers are known which satisfy all of the criteria mentioned wherein and a continuing need exists for improvements in such devices.

OBJECTS OF THE INVENTION

It is therefore the primary object of the present invention to provide a wire container of improved design for use with an automated wire harness fabrication system.

SUMMARY OF THE INVENTION

In accordance with the present invention, a wire container is disclosed which can be used to hold a variety of wires and can be easily transported between a wire prep station and a harness formation station. The container comprises two side members each having a cylindrical drum or hub with a flange on one end thereof. The cylindrical drum on one side member has a slightly larger inner diameter than the outer diameter of the drum on the other side member and is positioned and retained thereover in a manner to permit relative rotation between the side members during wire routing. The ends of the wire are preferably clamped within the flanges of the container by means of recessed spring steel clamps, which protect the wire ends from damage, although in one embodiment of the invention, the clamps are positioned on the rims of the flanges. Each side of the container includes an asymmetrical hole at the axis of the container which allows the container to be mounted at a registered angular position on the shaft of an end-effector. The majority of the container parts are preferably molded with plastic resin, and each wire end clamp can be specifically modified to accomodate a single wire or a pair of twisted wires.

BRIEF DESCRIPTION OF THE DRAWINGS

The foregoing and other objects, features and advantages of the invention will become apparent from the following detailed description of the preferred embodiments of the invention illustrated in the accompanying drawings in which like reference characters are assigned to the same parts throughout the different views.

DETAILED DESCRIPTION OF THE INVENTION

Figure 1:
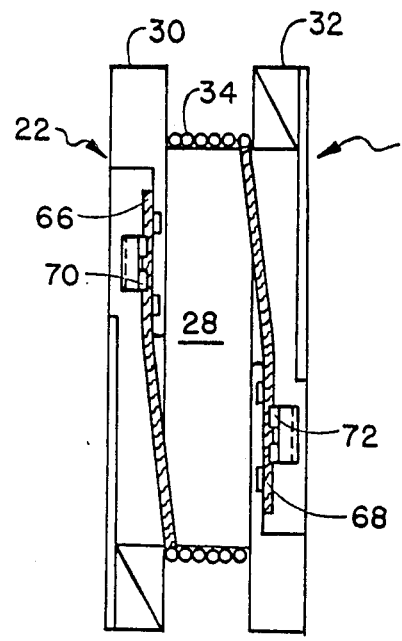
FIG. 1 is a front view of a preferred embodiment of a wire containers constructed according to the present invention.

Referring now to the drawings, and especially to FIGS. 1-4, there are depicted three orthogonal views of the preferred embodiment of the wire container of the present invention, and a section view taken through the rotational axis of the container to reveal the interior construction of the container.

Figure 4:
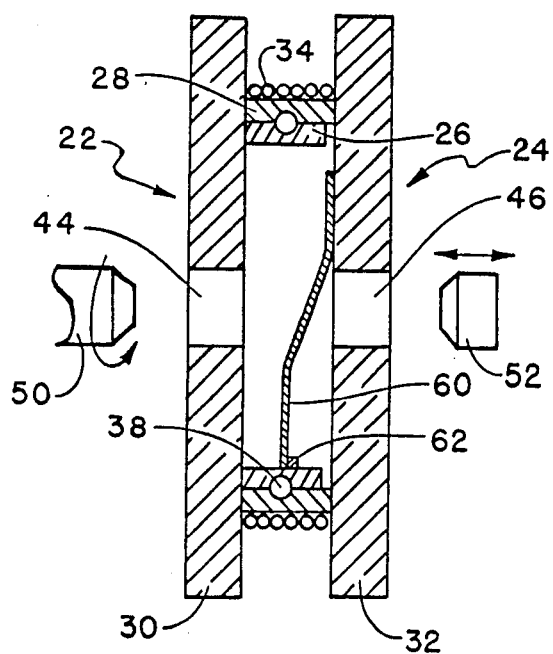
FIG. 4 is a sectional view taken through the line 4—4 of FIG. 2.

The container comprises two side members (22 and 24) each having a cylindrical drum (26 and 28 respectively) with a disk-shaped flange (30 and 32 respectively) coaxially disposed on one end thereof. As seen in FIG. 4, drum 28 has an inner diameter slightly larger than the outer diameter of drum 26 such that drum 26 will fit within drum 28. A coil of wire 34, which is to form a part of a wiring harness, is wound about drum 28 of side member 24. Only the end turns of wire 34 are shown in several of the views, the intermediate turns being left out to expose the underlying operative parts of the wire carrier, such as drum 28.

Drum 26 has a circumferential groove formed about its outer surface and drum 28 has a similar groove about its inner circumferential surface, which grooves together accommodate a retaining wire 38. The container is assembled by forcing retaining wire 38 into the groove of drum 26 and urging drum 28 over drum 26. After the two sides are assembled, the memory of retaining wire 38 will force wire 38 against the bearing surface groove of drum 28. The diameter of retaining wire 38 is sized so as to extend within the groove in drum 28, thereby preventing the two side members of the wire container from falling apart. With this arrangement, however, side member 22 is still free to rotate relative to side member 24.

Both side members 22 and 24 of the container each have a registration feature comprising D-shaped holes 44 and 46 respectively which are each located at the rotational axis of the container. Holes 44 and 46 are not only used to load the container onto shafts 50 and 52 associated with a wire-routing end-effector, but provide a means by which side member 22 can be rotated and side member 24 held stationary during wire routing. In addition, they also provide a registration feature by which the orientations of the clamped wire ends can be determined.

The wire container also has an anti-rotation clamping mechanism comprising the combination of spring member 60 on flange 32 and bearing ring 62 on the interior surface of drum 26. This rotation clamp mechanism can be designed to either create a specified drag between the side members 22 and 24 or to effectively lock the two side members of the container, in order to assure that side member 22 does not rotate relative to side member 24 during transport. The rotation clamp mechanism is designed to release as the shaft 52 of the wire routing end-effector enters the registration and support hole 46 during loading.

Figure 2:
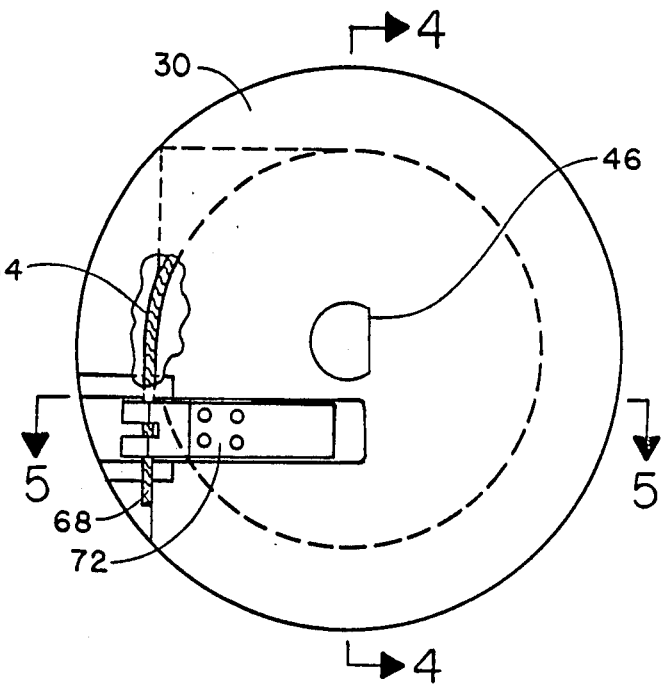
FIG. 2 is a side view of the wire container shown in FIG. 1.
Figure 3:
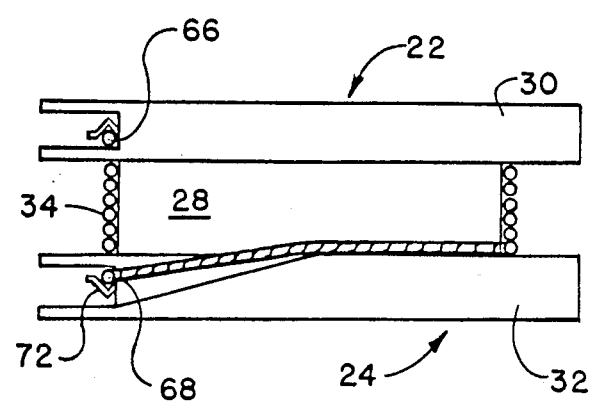
FIG. 3 is a top view of the wire container shown in FIG. 1.

FIGS. 1-3 show the wire container holding wire 34 whose ends 66 and 68 are held in place by wire clamp mechanisms 70 and 72 which are recessed within flanges 30 and 32 respectively and thereby protected from damage during transport of the container to the harness fabrication station by various transport mechanisms, such as a conveyor belt.

Wire clamps 70 and 72 are preferably spring steel members which are attached to the flanges of the container and grip the wire ends. The wire end clamps 70 and 72 can be easily opened and are configured to handle any type of wire end preparation, such as a tinned end, contact end, lug end, or a 0.25 inch outer diameter cable end. The wire end clamps are either manually or mechanically opened during the wire loading step at the wire preparation, and easily release their grasp on a wire end when the wire routing end-effector gripper pulls on the wire end to place the wire end into a holder on a formboard at a wire harness formation station. Basically the same end-effector design that will be used to route the wire at a harness formation station will be used to load the wire into the container at a wire prep station.

Figure 5:
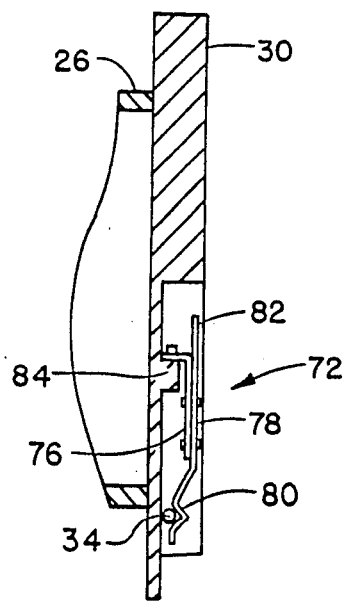
FIG. 5 is a sectional view taken through the line 5—5 of FIG. 2.

FIG. 5 is a section view taken through the line 5—5 of FIG. 2 and depicts the side view of the wire clamp mechanism 72. It will be seen that the clamp mechanism 72 consists of two steel strap spring members 76 and 78 which are riveted together. One end 80 of member 78 bears against wire 34 and the other end 82 provides a lever to which force can be applied to open clamp mechanism 72. Spring member 76 is L shaped and affixed to a projection 84 on flange 30.

Figure 6:
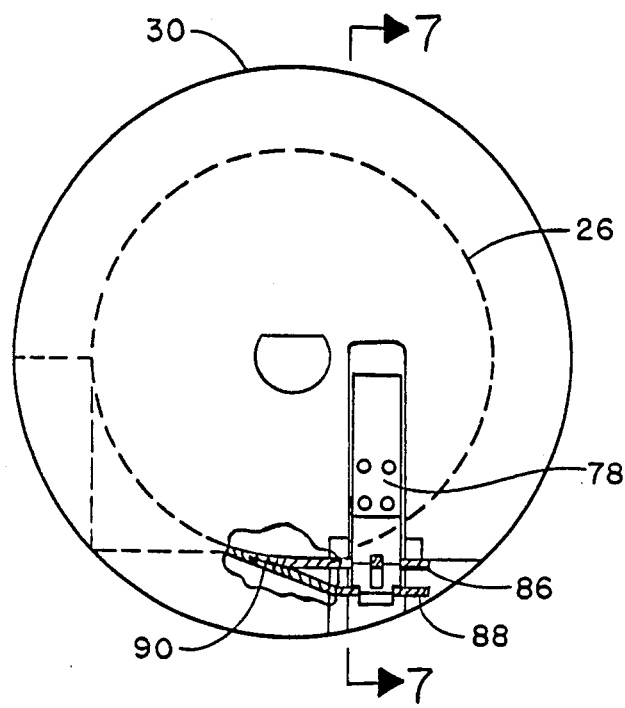
FIG. 6 is a side view of another embodiment of a wire container constructed according to the present invention and specifically adapted for use with twisted pair wires.
Figure 7:
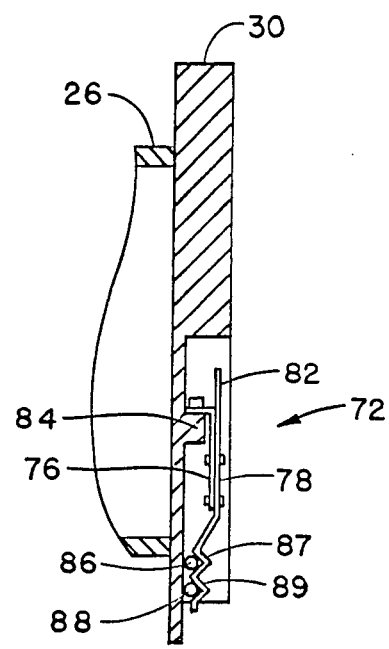
FIG. 7 is a sectional view taken through the line 7—7 of FIG. 6.

FIGS. 6 and 7 illustrate how the clamp mechanism 72 can be slightly altered to have two V shaped portions 87 and 89 which hold both wire ends 86 and 88 of a twisted pair cable 90. This arrangement allows the wire routing end-effector to locate and place all four wire ends (two at a time) in specified locations on a formboard at a harness formation station. Then a contact insertion end-effector is able to retrieve all four contacts (one at a time) and perform contact insertions.

Figure 8A:
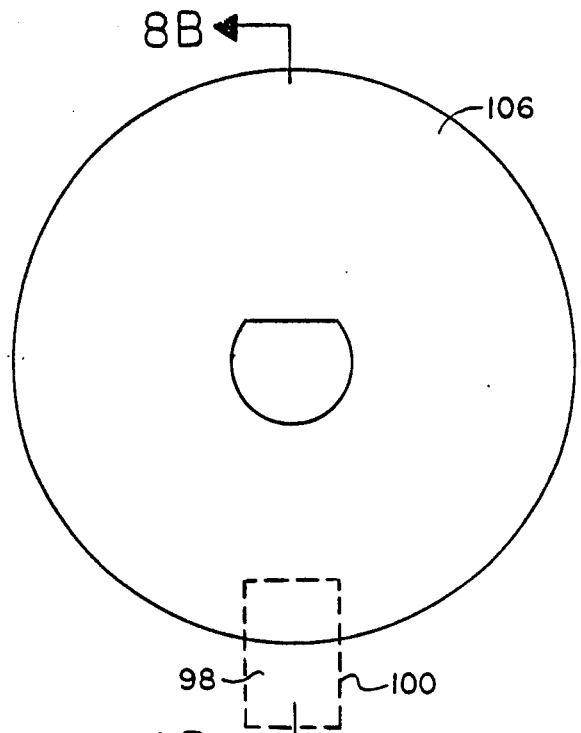
FIGS. 8A and 8B are side and sectional front views respectively of yet another embodiment of a wire container constructed according to the present invention and having projecting wire clamping means.
Figure 8B:
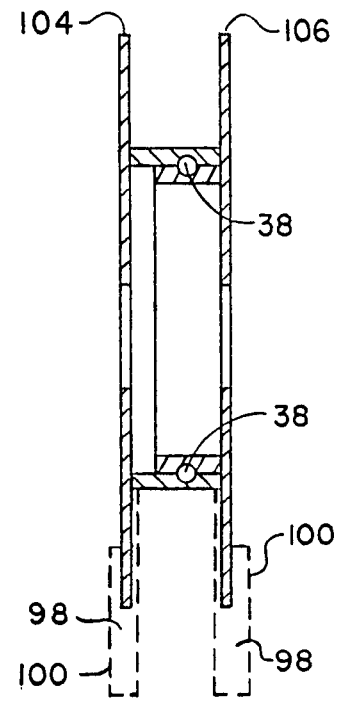

As discussed above, the wire container is preferably constructed such that the wire end clamping mechanisms 70 and 72 are recessed within the flanges of the container, to protect the clamps and the wire ends held thereby. It is recognized, however, that the container can be simplified and its cost reduced if the situation permits affixing wire clamps to the rim of the container flanges, as for example in the areas 98 enclosed by dashed lines 100 shown in FIGS. 8A and 8B of the drawings. It will be seen in FIG. 8B, that in this alternate embodiment, the thickness of the flanges, such as flanges 104 and 106, may be greatly reduced. However, the other novel features of the invention discussed earlier are still utilized and remain unchanged.

Figure 9B:
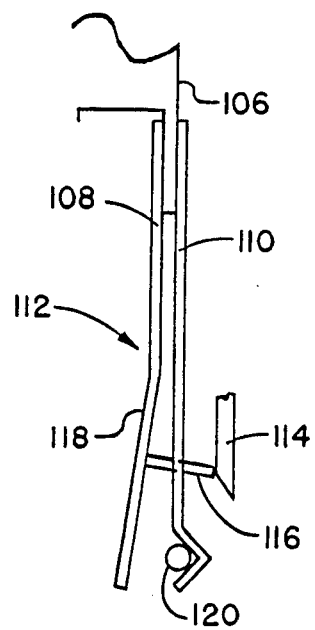
FIGS. 9A and 9B are partial side and front views of the wire end clamp portion of FIGS. 8A and 8B.
Figure 9A:
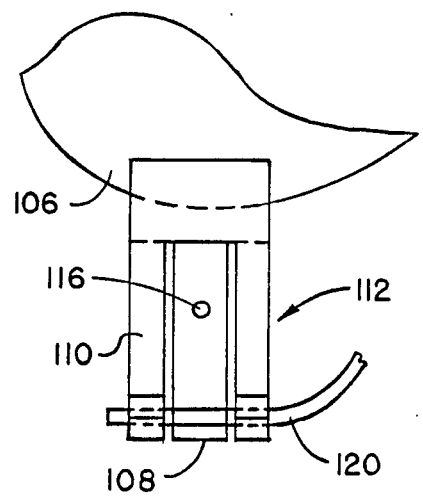

FIGS. 9A and 9B are fragmentary side and front views which depict the construction of such an exposed wire clamp 112. Clamp 112 includes two leaf spring fingers 108 and 110 which grip a wire end 120. Clamp 112 is automatically opened by slider element 114 of an end-effector which pushes against a rod 116 attached to the inner spring steel finger 118 of wire clamp 112 to release wire end 120.

Figure 10:
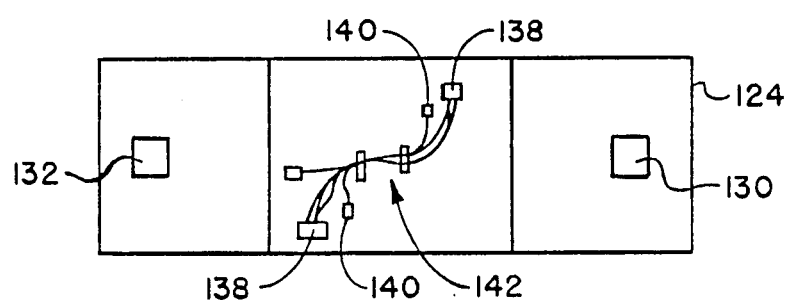
FIGS. 10 and 11 are elementary top and front views respectively of a two robot arm wire harness fabrication station.
Figure 11:
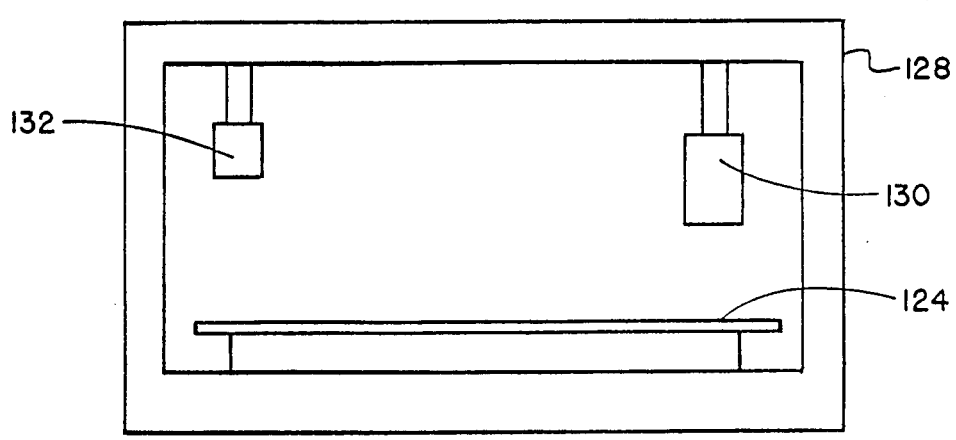

FIGS. 10 and 11 depict, in elementary form, the formboard 124 and front view respectively of a wire harness fabrication station 128 which might utilize the wire container of the present invention. The station includes a robot arm wire routing end-effector 130 and a robot arm contact insertion end-effector 132 which are automatically movable to any positions above formboard 124 to route wires between various connectors 138 and wire end holders 140 to form a wire harness 142.

Typical steps involved in forming a wire harness are as follows:

A wire container, such as that depicted in FIGS. 1–5, is loaded at the wire prep station. The length of wire is wrapped around the drum 28 of the container and the wire ends 66 and 68 are clamped and face in opposite directions. The wire container is then placed on its side member 22 and transported to the harness formation station. The wire container is then placed upright and the D-shaped registration holes 44 and 46 are automatically inspected to determine the orientation of the wire end clamps 70 and 72. The shafts 50 and 52 of the wire routing end-effector (one for each side of the container) are rotated to allow proper pickup and registration of the container. The container is loaded on the load shafts of the wire routing end-effector 130 which releases the anti-rotation clamp during loading.

A gripper (not shown) on the wire routing end-effector removes the wire end 66 from wire clamp mechanism 70 and places the wire end 66 into a holder 140 on formboard 124.

The wire routing end-effector 130 routes the wire along a predetermined two-dimensional path, until the known length of wire is routed. Side member 24 of the container can either be free wheeling during wire routing, or can be motor driven, with the motor speed dependent on the desired wire tension. A second gripper on the wire routing end-effector 130 removes the second wire end 68 from the clamp 72 on side 24 of the container and places the wire end 68 into a holder 140 on formboard 124. The container is then unloaded from the wire routing end-effector 130 and returned to the wire prep station. At this time, contact insertion end-effector 132 can be activated to retrieve wire ends having contacts thereon from their temporary holders 140 for insertion into appropriate connectors 138.

If the wire container of the present invention depicted in FIGS. 9A and 9B is used, it may be possible to insert the wire end directly from its wire clamp mechanism into a wire holder 140 on formboard 124 without the use of a gripper on the wire routing end-effector 130.

Although the invention has been described with reference to particular embodiments thereof, other adaptations and modifications of the invention will be apparent to those of skill in the art and hence it is intended by the appended claims to cover all such modifications and adaptations as fall within the true spirit and scope of this invention.

What is claimed is:

1. Wire containing apparatus comprising:
   first and second members each having a cylindrical drum and a flange of circular cross section concentric with said drum and disposed on one end thereof;
   said drum of said first member having an outer diameter substantially equal to the inner diameter of said drum of said second member and being positioned within said drum of said second member;
   retainer means disposed between said drums of said first and second members to retain the drum of said first member within the drum of said second member while permitting rotational motion therebetween;
   container registration means situated at the axis of said flanges of said first and second members respectively,
   anti-rotation means disposed between the inner side of said flange of said second member and the inner wall of said drum of said first member; and
   wire clamping means disposed on the side wall flange of said first and second members.

2. Wire containing apparatus as defined in claim 1 wherein said wire clamping means comprise first and second flat leaf spring mechanisms fastened to and recessed within said flanges of said first and second members respectively.

3. Wire containing apparatus as defined in claim 2 wherein said drum of said first member has a groove formed about its outer circumferential surface and said drum of said second member has a groove formed about its inner circumferential surface, and wherein said retainer means is a retaining wire positioned within the groove of said first member, said retaining wire having a diameter sized so as to extend above the groove about said drum of said first member and fit within the groove about said drum of said second member.

4. Wire containing apparatus as defined in claim 3 wherein said container mounting and registration means comprise a first D-shaped hole formed at the rotational axis of said flange of said first member, and a D-shaped hole formed at the rotational axis of said flange of said second member.

5. Wire containing apparatus as defined in claim 4 wherein said anti-rotation means comprises a leaf spring affixed to the flange of said second member, and a bearing ring formed about the inner circumference of the drum of said first member, the free end of said leaf spring applying a frictional force against a surface of said bearing ring.

6. Wire containing apparatus as defined in claim 1 wherein said wire clamping means are affixed to the rims of said flanges of said first and second members and extend outwardly therefrom.

* * * * *